US011745427B2

(12) United States Patent
Soman et al.

(10) Patent No.: US 11,745,427 B2
(45) **Date of Patent: *Sep. 5, 2023**

(54) HYBRID ADDITIVE-SUBTRACTIVE LASER FABRICATION PLATFORM FOR SHAPING HYDROGELS

(71) Applicants: Pranav Soman, Liverpool, NY (US); Puskal Kunwar, Syracuse, NY (US); Zheng Xiong, Syracuse, NY (US)

(72) Inventors: Pranav Soman, Liverpool, NY (US); Puskal Kunwar, Syracuse, NY (US); Zheng Xiong, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,874

(22) Filed: Feb. 17, 2022

(65) Prior Publication Data

US 2022/0168955 A1 Jun. 2, 2022

Related U.S. Application Data

(63) Continuation of application No. 16/973,235, filed as application No. PCT/US2019/041290 on Jul. 11, 2019, now Pat. No. 11,260,596.

(60) Provisional application No. 62/696,551, filed on Jul. 11, 2018.

(51) Int. Cl.

*B29C 64/135* (2017.01)
*B29C 64/277* (2017.01)
*G02F 1/37* (2006.01)
*B33Y 10/00* (2015.01)
*B33Y 30/00* (2015.01)
*B33Y 70/00* (2020.01)

(52) U.S. Cl.

CPC .......... *B29C 64/277* (2017.08); *B29C 64/135* (2017.08); *G02F 1/372* (2021.01); *B33Y 10/00* (2014.12); *B33Y 30/00* (2014.12); *B33Y 70/00* (2014.12)

(58) Field of Classification Search

None

See application file for complete search history.

(56) References Cited

U.S. PATENT DOCUMENTS

2018/0257297 A1* 9/2018 Matheu .................. A61L 27/26
2019/0193330 A1* 6/2019 Chen .................. G03H 1/2205

* cited by examiner

*Primary Examiner* — Yung-Sheng M Tsui
(74) *Attorney, Agent, or Firm* — David Nocilly

(57) ABSTRACT

A hybrid laser printing (HLP) technology that utilizes ultrafast laser in sequential additive-subtractive modes to create 3D hydrogel constructs. The approach involves the synergistic use of additive crosslinking and subtractive ablation processes that are conventionally mutually exclusive. HLP can be operated at virtually any penetration depth and allow fabrication of multi-layer hydrogel constructs at micrometer resolution. HLP was used to print ready-to-use functional chips using commonly used hydrogels for potential cellular communication and migration applications. HLP was also found to be compatible with in situ printing of cell-laden hydrogel constructs. HLP makes shaping of soft hydrogels into 3D multiscale functional devices possible.

8 Claims, 25 Drawing Sheets

HYBRID ADDITIVE-SUBTRACTIVE LASER FABRICATION PLATFORM FOR SHAPING HYDROGELS

CROSS-REFERENCE TO RELATED APPLICATIONS

The present application is a continuation of U.S. Non-Provisional application Ser. No. 16/973,235, filed on Dec. 8, 2020 as a national stage of PCT/US2019/41290, filed on Jul. 11, 2019, which claimed priority to U.S. Provisional No. 62/696,551, filed on Jul. 11, 2018.

BACKGROUND OF THE INVENTION

1. Field of the Invention

The present invention relates to manufacturing of three-dimensional hydrogels and, more particularly, to the creation of three-dimensional structures in hydrogels using combined additive and subtractive approaches.

2. Description of the Related Art

Advances in microfabrication technologies and synthesis of new hydrogel materials have found widespread applications in biomedical sciences, to create biomimetic cell and tissue models that provide insight into fundamental biological processes, and in non-biomedical applications such as soft electronics, sensors and actuator. Although a large library of functional hydrogels continues to be synthesized, sculpting and shaping these soft hydrated materials into complex multiscale functional devices remains challenging. In recent years, additive fabrication methods, such as fused deposition modeling and stereolithography, have been used to print hydrogel constructs; however, creating multiscale hydrogel-based devices with three dimensional (3D) internal features remains difficult.

Ultrafast lasers have revolutionized the processing of hydrogels due to its unique property of nonlinear multiphoton absorption that allows localized additive crosslinking and subtractive removal of material within hydrogels with minimal collateral damage of surrounding regions. Although ultrafast lasers have been used in both additive crosslinking and subtractive ablation modes, efforts to combine these two well established methods into a single versatile manufacturing platform have been difficult due to material incompatibilities or significant differences in laser processing requirements of the two processes. Few research groups have used non-hydrogel materials such as epoxy based photoresists, glass and silica to demonstrate a proof-of-concept of a hybrid additive-subtractive approach. However, low laser penetration depth, associated with the optical absorption and scattering properties of the material, has limited the fabrication to thin sub-millimeter sized constructs. Moreover, current hybrid methods typically utilize toxic photoresist, harsh chemical and processes, that are not compatible with living cells, or mechanically weak hydrogels.

BRIEF SUMMARY OF THE INVENTION

The present invention comprises the design and development of a new hybrid laser printing (HLP) method that allows for processing of multiscale multi-material hydrogel-based constructs for use in new research applications in the biomedical sciences. HLP comprises a femtosecond laser source (Coherent Chameleon-Ultra Ultrafast Ti:Sapphire) with two additive modes and one subtractive mode of operation. The first additive crosslinking mode is created by passing the fs-laser through a second harmonic generator (SHG) to obtain ultraviolet wavelengths and then spatially modulating via a Digital Micromirror Device (DMD). Based on a user-defined image, DMD can selectively switch mirrors into either an ON state or an OFF state and create a light pattern that selectively crosslinks photosensitive hydrogel layer into 2D layers of a defined thickness. The second additive mode utilizes a fs laser beam directed and focused via an objective to selectively crosslink photosensitive hydrogels. The subtractive ablation mode utilizes an fs laser beam directed via an objective lens to ablate voids within the previously crosslinked layer. HLP does not rely on the optical properties of hydrogels and thus can be potentially extended to an ever growing library of photosensitive hydrogels to fabricate large scale easy-to-use devices and constructs. HLP also does not require any specialized hydrogels such as ones with functionalized cleavable photolabile groups. The unique capability of HLP to fabricate multiscale functional devices using difficult to process soft hydrogel materials can be transformative for a large number of applications in biomedical sciences.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 8A:
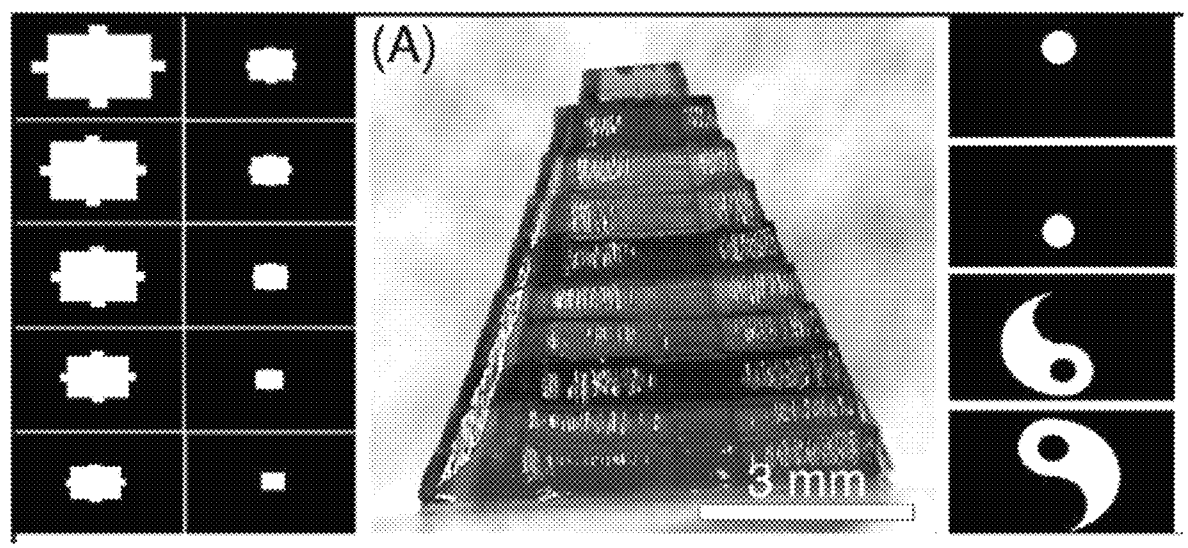
FIG. 8A is a schematic and image illustrating digital mask and multicolored Mayan pyramid fabrication using multi-material additive printing of three different colors of 90% PEGDA, 1% LAP prepolymer solutions.
Figure 8B:
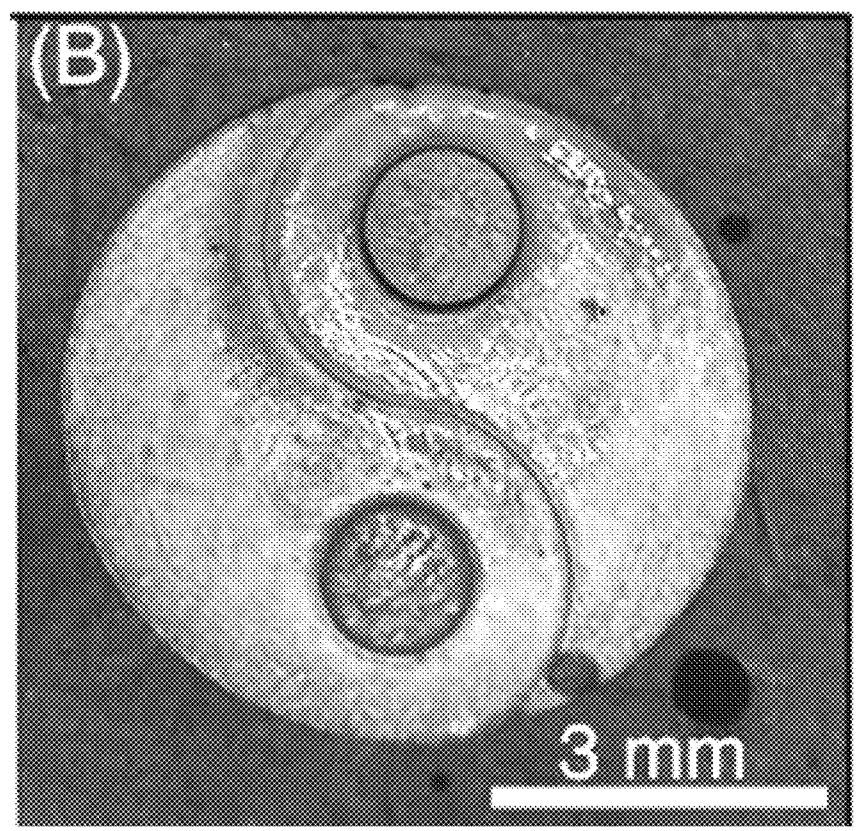
FIG. 8B is a schematic and image illustrating a yin and yang structure printed using four different colored 90% PEGDA, 1% LAP pre-polymer solutions.
Figure 8C:
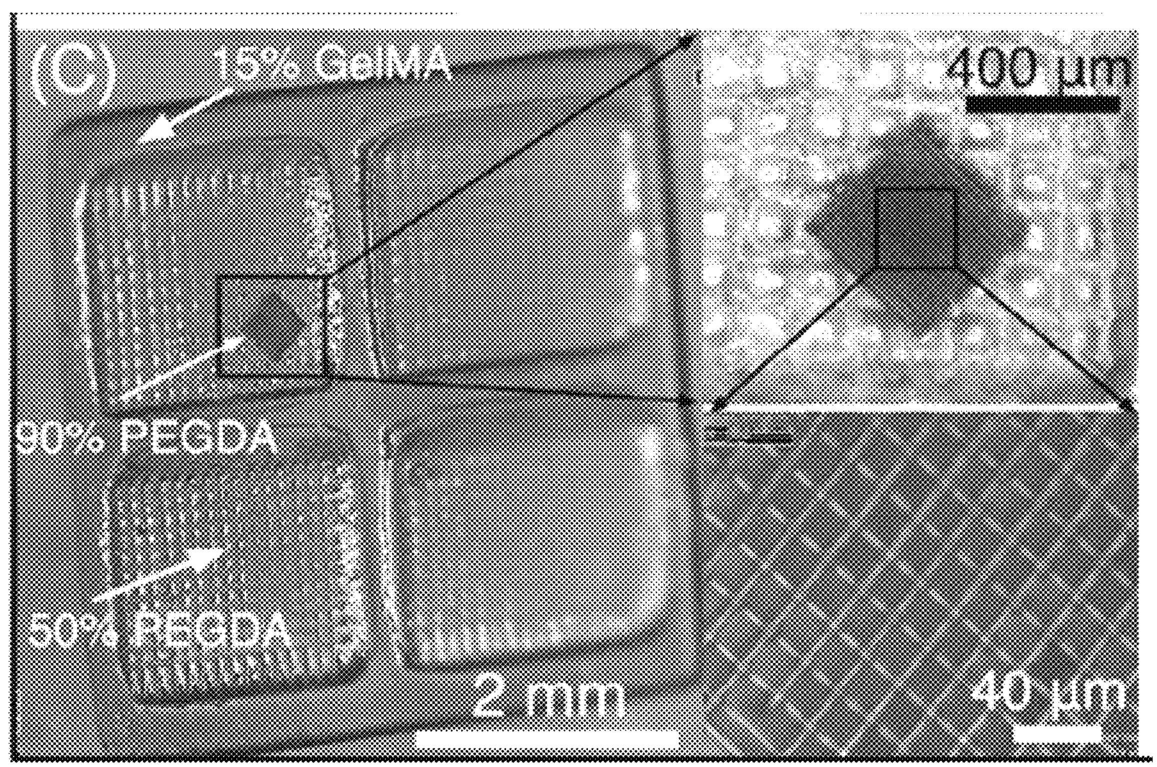
Figure 8D:
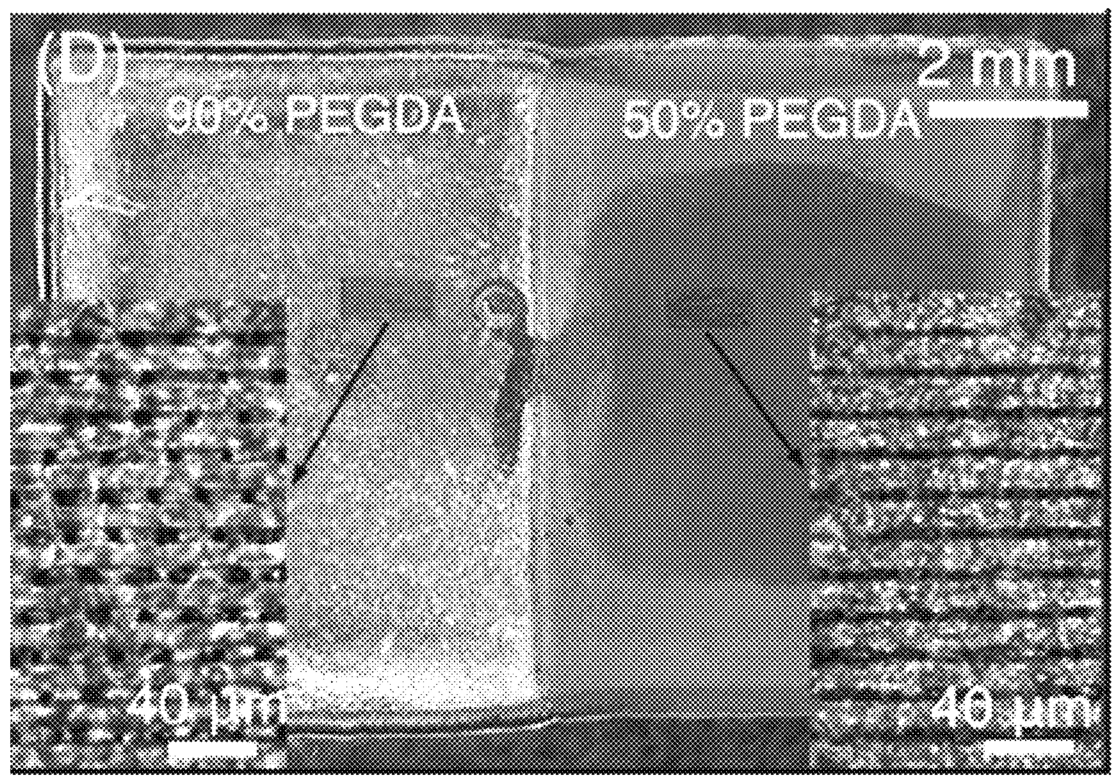
Figure 8E:
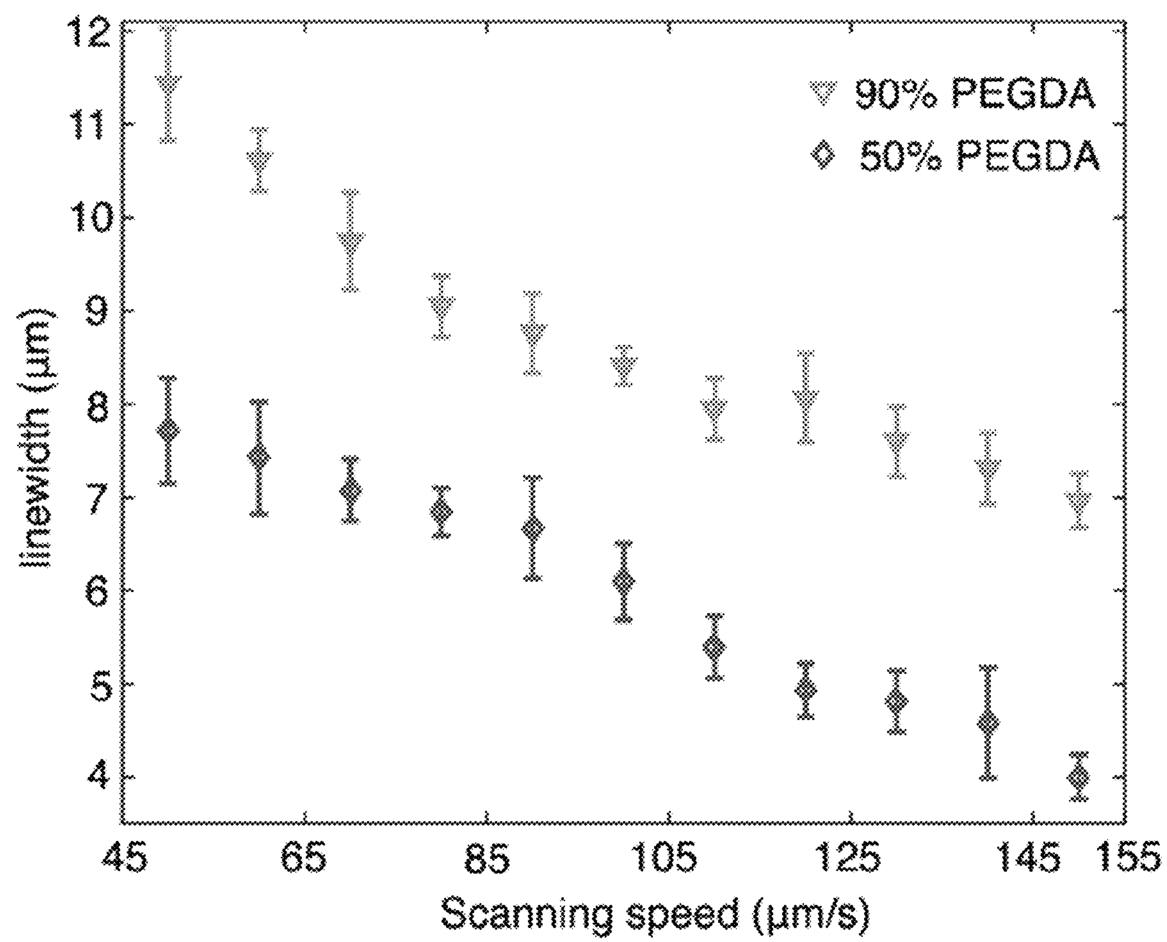

FIG. 8C is a series of images illustrating multiscale printing of a multimaterial structure using two commonly used hydrogel (GelMA and PEGDA) where the outer wall was printed with 15% GELMA, 0.5% LAP and the intersecting lines were printed using 50% PEGDA, 1% LAP, with a wood pile structure inside the black square box printed using an MPP based DLW approach using 90% PEGDA, 1% LAP;

FIG. 8D is a series of images illustrating an additive and subtractive multimaterial approach of fabrication using 90% PEGDA, 0.5% LAP and 50% PEGDA, 0.5% LAP, with insets showing zoomed versions of ablated lines using MPA;

FIG. 8E is a graph of linewidth of the ablated features using a laser power of 1300 mW that was kept constant as the scanning speed was varied from 6 the 50 μm/s to 150 μm/s to ablate feature in 90% PEGDA, 0.5% LAP and 7 50% PEGDA, 0.5% LAP.

DETAILED DESCRIPTION OF THE INVENTION

Figure 1A:
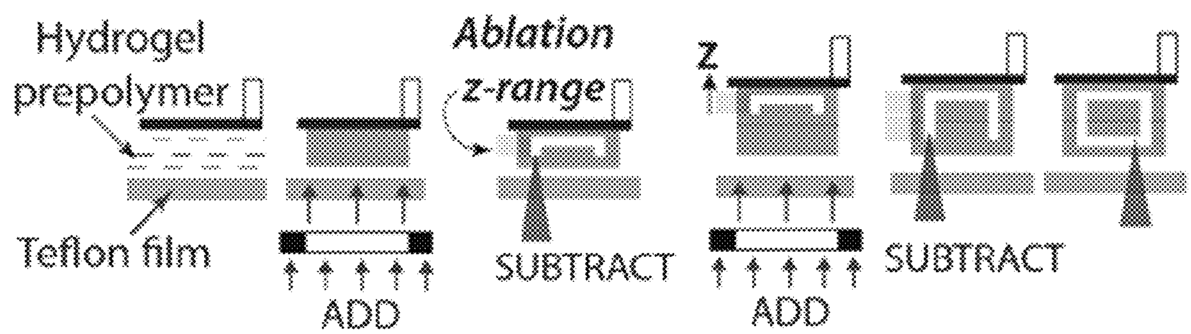
FIG. 1A is a schematic of a typical process-flow used during femtosecond laser-based additive-subtractive hybrid laser printing (HLP) according to the present invention.
Figure 1B:
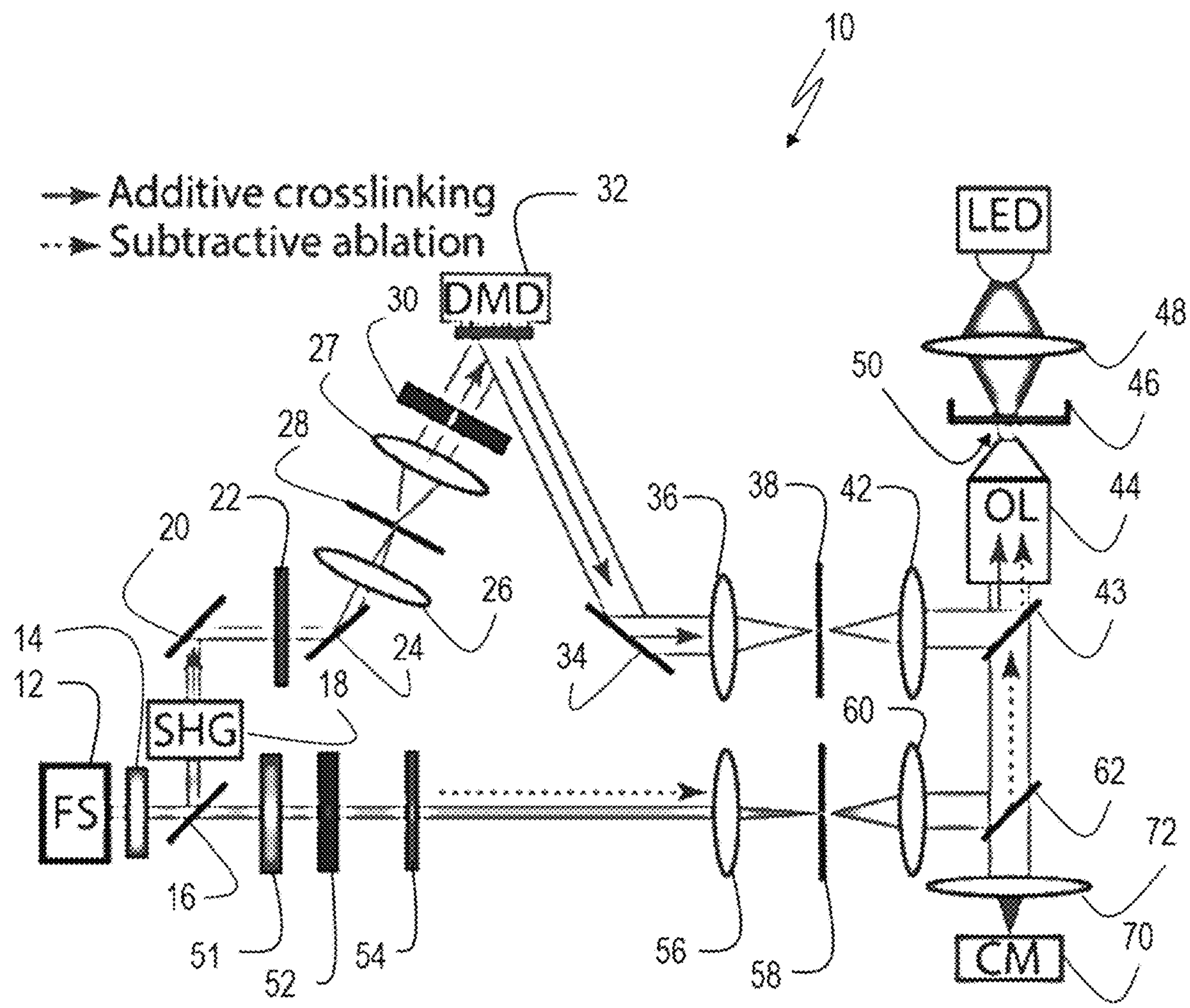
FIG. 1B is a schematic of a femtosecond laser-based additive-subtractive HLP system setup according to the present invention.

Referring to the figures, wherein like numeral refer to like parts throughout, there is seen in FIG. 1A a hybrid laser printing (HLP) system 10 that employs a femtosecond laser source for sequential additive and subtractive modes of fabrication. Referring to FIG. 1B, system 10 comprises a femtosecond laser 12 aligned with an isolator 14 and a beam splitter 16 for creating an additive beam path and a subtractive ablation beam path. The additive beam path formed by beam splitter 16 includes a second harmonic generator 18, mirror 20, and shutter 22. Shutter 22 is aligned with a flip mounted mirror 24 that redirects the first beam path through a lens 26, pin hole 28, lens 27, and diffuser 30 onto a digital micromirror device 32. Digital micromirror device 32 controls and directs the laser light of additive beam path onto a second mirror in a flip mount 34, a lens 36, a pin hole 38, and another lens 42. A dichroic mirror 43 reorients additive beam path to an objective lens 44 aligned with a sample holder 46 on an elevating stage 48. A TEFLON® window 50 is positioned on stage 48. Subtractive ablation beam path extends from beam splitter 16 through a polarizer 51, half wave plate 52, shutter 54, fifth lens 56, pin hole 58, and another lens 60. A dichroic mirror 62 redirects subtractive ablation beam path to objective lens 44 and sample holder 46. A camera 70 and lens 72 may be used to capture images of the process.

The additive crosslinking mode is thus created by passing the fs-laser beam from femtosecond laser 12 through second harmonic generator 18 to obtain ultraviolet wavelengths and then spatially modulated via digital micromirror device 32. Digital micromirror device 32 is an electronic board embedded with an array of micromirrors. Based on a user-defined image, digital micromirror device 32 can selectively switch mirrors into either an ON state or an OFF state and create a light pattern that selectively crosslinks a photosensitive prepolymer solution in sample holder 46 into 2D layers of a defined thickness. The subtractive ablation mode utilizes a fs laser beam from femtosecond laser 12 directed via an objective lens 46 to ablate voids within the previously crosslinked layer.

Figure 1C:
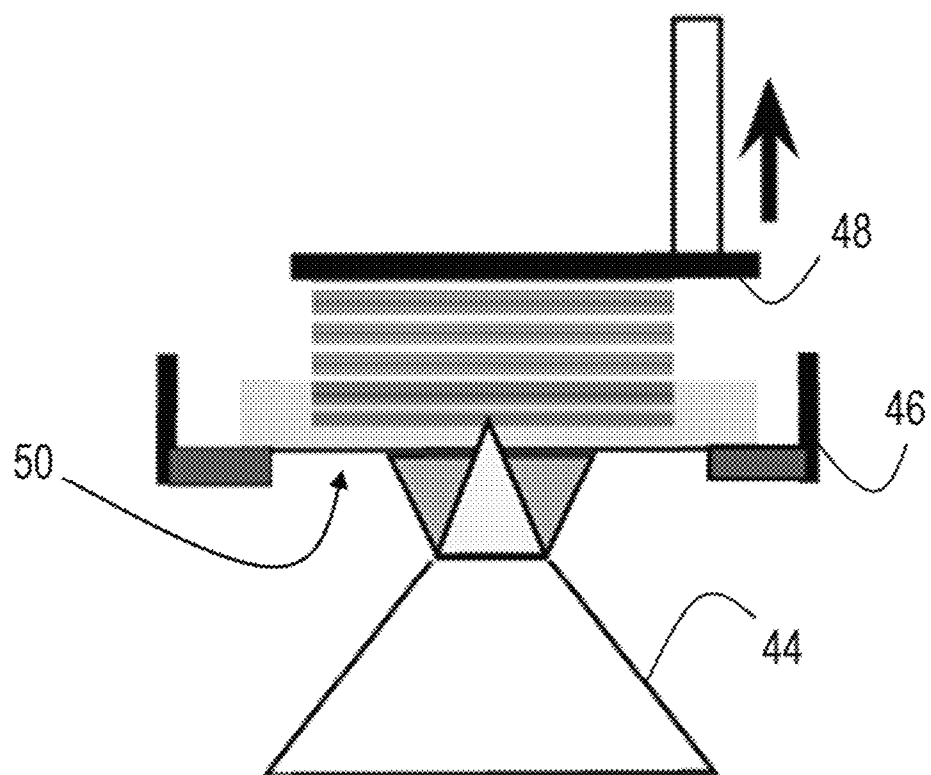
FIG. 1C is a schematic of a sample holder and femtosecond laser-based additive-subtractive HLP system according to the present invention.

The additive mode can print ~1 $cm^2$ features in XY with smallest feature size of 30 μm, while the subtractive mode can ablate features with a resolution range of 3 μm, based on the absorption properties of the hydrogel prepolymer. FIG. 1A shows one sequence of the process flow of additive DMD crosslinking (CLIP) and subtractive multiphoton laser ablation (MPA). FIG. 1C shows sample holder 46, stage 48 and TEFLON® window 50.

Sample holder 46 may comprise an assembly having a heater (e.g., WP-16 Warner instrument) and a plastic petri dish as the prepolymer hydrogel solution holder one an L shaped stage 48. The heater is maintained at 40° C. for GelMA printing and is turned off during PEGDA printing. The L-shaped stage 48 is controlled by a three-dimension linear stage and controller EPS301 (Newport). A hole may be bored in the center of the petri dish and a 45 μm thick TEFLON® film (TEFLON® AF 2400) glued therein as a bottom window 50. An oxygen permeable (1000 barrers; 1 barrer=10-10 cm3 (STP) cm cm−2 s−1 cmHg−1), UV transparent, and chemically inert TEFLON® film was used as a bottom window to ensure that the fabricated structure does not get attached to the solution holder.

Figure 2A:
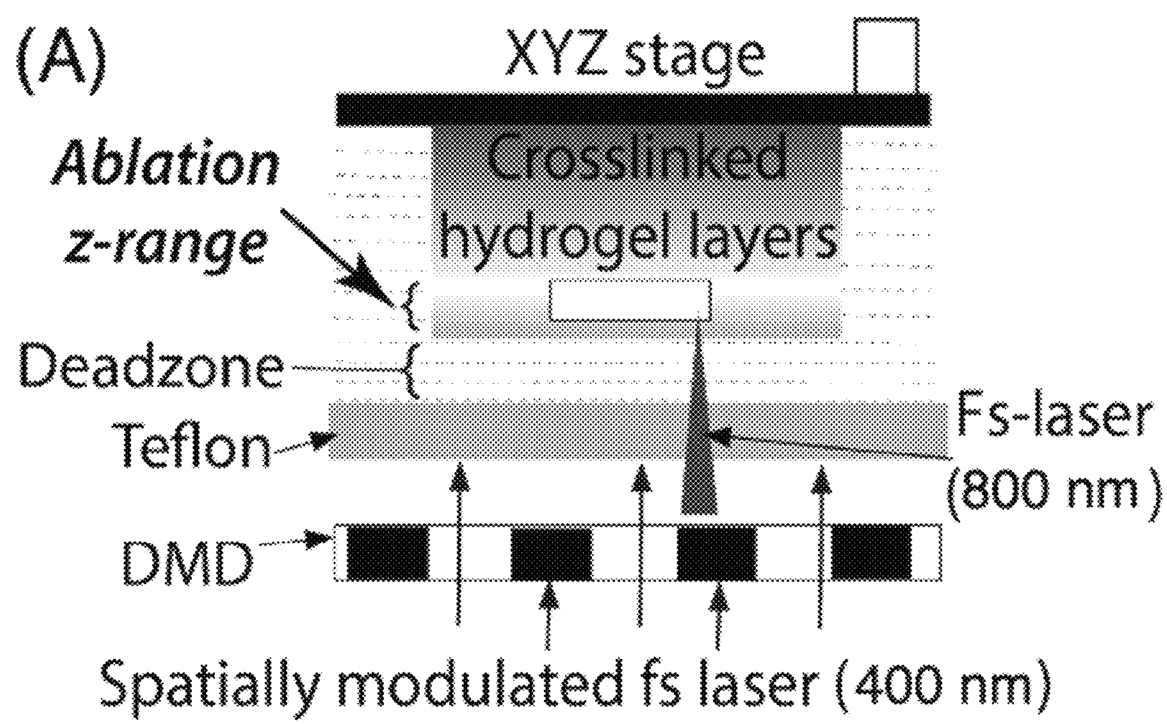
FIG. 2A is a schematic of the key parameters involved in an HLP system according to the present invention.

Fundamental to the HLP process of the present invention is the relationship between the 'dead zone' from the additive mode, and the ablation z-range from subtractive MPA mode, as seen in FIG. 2A. Characterization of dead-zone is necessary for accurate determination of speed and z resolution during the additive step while assessment of ablation z-range is important to determine the exact location of laser focus during the subtractive mode. The dead-zone is a thin, uncrosslinked prepolymer solution between the TEFLON® window and the crosslinked hydrogel structure attached to the stage. This zone is created due to the inhibition of the photo-crosslinking process, a result of diffusion of oxygen through the permeable TEFLON® window. This prevents the adhesion of newly crosslinked layers to the bottom window and the liquid hydrogel prepolymer solution can freely refill the fabrication area adjacent to the TEFLON® window. The dead-zone thickness can vary in the order of tens of micrometers depending upon the control parameter such as laser intensity, exposure time, crosslinking properties of hydrogel, and local oxygen concentrations. Furthermore, the dead-zone defines the relationship between print speed and part resolution in the additive mode, and influences the linewidth of ablation part and penetration depths in the subtractive fabrication mode.

The ablation z-range is the region within the crosslinked hydrogel layers where material can be reliably removed in the subtractive ablation mode of HLP, as illustrated in FIG. 2A. The two-photon absorption induced ablation process is limited to certain depth due to light absorption and scattering effects within the hydrogel, which defines the upper end of the ablation z-range. The lower end of the ablation z-range is the region just above the dead-zone within the crosslinked hydrogel layer. Operating in this z-range ensures that the pre-polymer solution does not inadvertently crosslink during the subtractive ablation step and avoids forming unwanted bubbles.

For determination of the ablation z-range, a PEGDA prepolymer (90% by weight (wt), 700 MW) was mixed with the water soluble photoinitiator lithium phenyl-2,4,6-trimethylbenzoylphosphinate (LAP 1% by wt), which was chosen as a model synthetic hydrogel prepolymer solution. It should be recognized that other hydrogel prepolymers may be used with the present invention. Wavelengths of 400 nm and 800 nm were chosen for additive crosslinking ($\lambda_{add}$) and subtractive ablation ($\lambda_{sub}$) modes respectively. In order to estimate the dead-zone, the L shaped stage was placed exactly at 200 μm from the surface of the Teflon window. A spatially modulated laser beam ($\lambda_{add}$=400 nm) was used to crosslink a uniform square shaped structures for a range of crosslinking laser power ($P_{add}$) and add, exposure time ($t_{add}$).

Figure 2B:
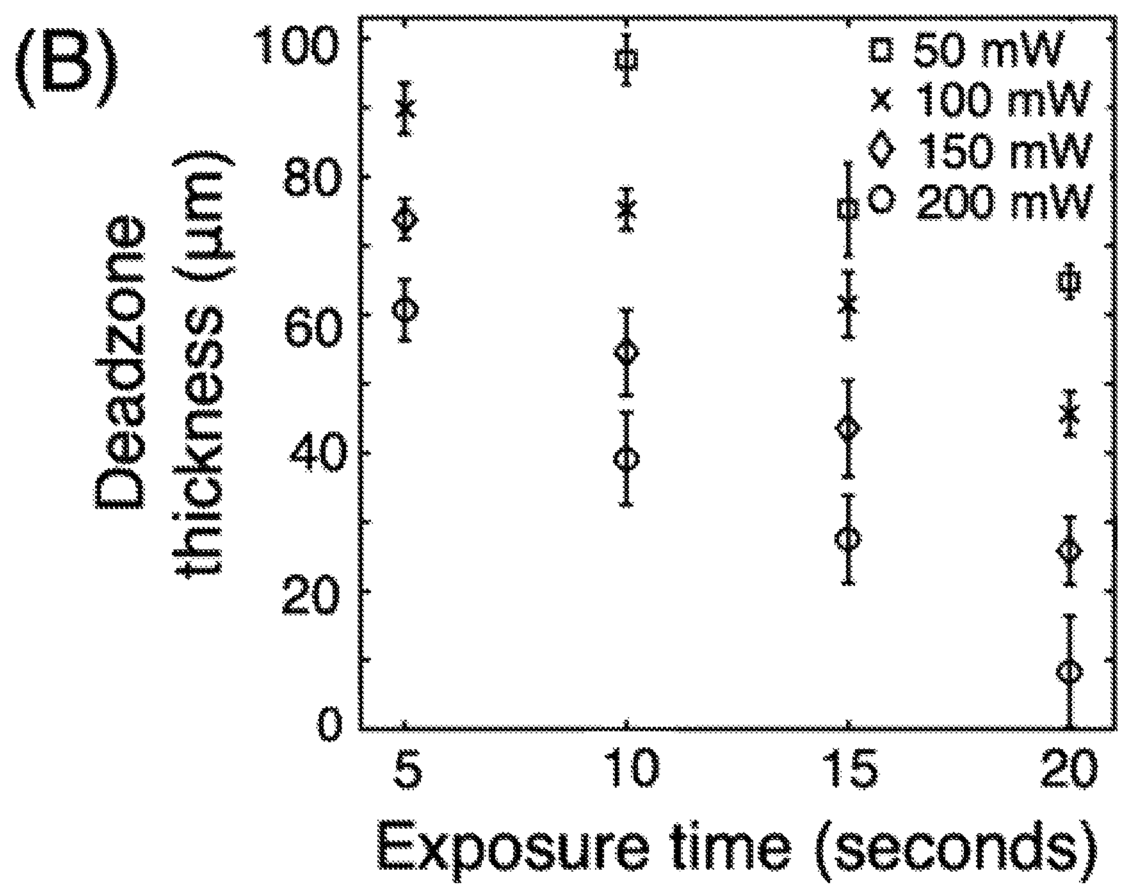
FIG. 2B is a graph of deadzone thickness as the function of exposure times and laser powers.

The thickness of the structures was measured using HIROX microscopy and was subtracted from 200 μm to obtain the dead-zone thickness as a function of $P_{add}$ and $t_{add}$, as seen in FIG. 2B. For the laser dosage used in the present invention, the dead-zone thickness ranges from 9±8 μm to 97±3.5 μm and show a decreasing trend with increasing laser dosage. It is worth noting, that for all experiments, laser power was measured at the back aperture of the objective lens. The coverslips used in this work were methacrylated to ensure adhesion of crosslinked structure.

Figure 2C:
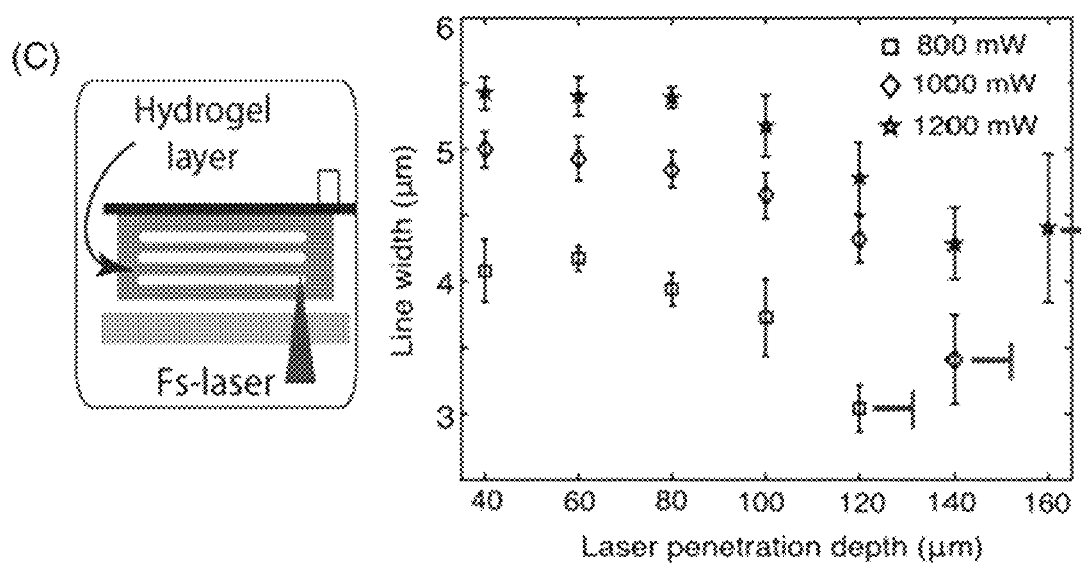
FIG. 2C is a schematic and graph of ablated line width as a function of laser penetration depths and laser powers.

To measure the ablation z-range, the width of the ablated lines was characterized at different depths of crosslinked structure (FIG. 2C). First, a PEGDA slab was crosslinked using crosslinking laser power ($P_{add}$) of 150 mW and exposure time ($t_{add}$) of 20 seconds that results in small dead-zone of 30 μm. Next, lines were ablated within the crosslinked structure using the ablation laser powers of ($P_{sub}$) of 800 mW, 1000 mW and 1200 mW, and scanning speed ($v_{sub}$) of 100 μm/s. The ablated lines were written at the depth of 40 μm to 160 μm from the surface of TEFLON® window. Results demonstrate a decrease in line-width with an increase in laser penetration depth, due to light absorption and scattering within the sample for all the laser powers. For $P_{sub}$ of 800 mW, 1000 mW and 1200 mW, the upper ends of ablated z-range were measured to be 120 μm, 140 μm and 160 μm, respectively. The lower ends of ablation-range were obtained from the dead zone plot of FIG. 2B. For a particular additive step with $P_{add}$ of 150 mW and $t_{add}$ of 20 seconds, the dead-zone thickness was measured as 30 μm, while for a particular subtractive step with $P_{sub}$ of 1200 mW and $v_{sub}$ of 100 μm/s, the upper end of the range was measured to be 160 μm, giving an ablation z-range of ~35-160 μm. In a similar fashion, ablation z-ranges were calculated for a range of laser powers and scanning speeds, and these parameters were used to automate the HLP platform.

Figure 2D:
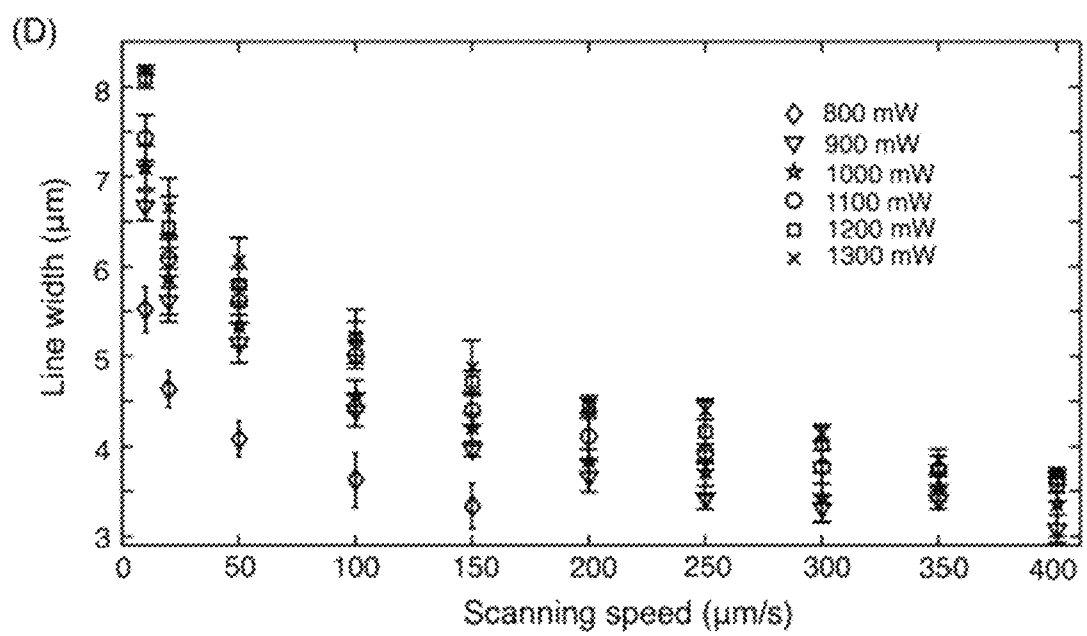
FIG. 2D is a graph of ablated line width as a function of scanning speeds and laser powers.

Next, the amount of material removal during the subtractive step of HLP was characterized in term of ablation line width, as seen in FIG. 2C. To do so, ablation laser powers ($P_{sub}$) and scanning speeds ($v_{sub}$) were varied and the widths of the ablated lines were measured. First, hydrogel slabs were crosslinked with $P_{add}$ of 150 mW and $t_{add}$ of 20 seconds. Second, laser ablation was carried out at a depth of 100 μm from the TEFLON® surface, and width of the ablated lines was measured using an optical microscope and the data was recorded by averaging 5 readings. As seen in FIG. 2D, results show that the ablated line width decreases from 8 μm to 3 μm with an increase in scanning speeds ($v_{sub}$) and a decrease in ablation laser powers ($P_{sub}$). This data was used to determine the ablation laser power and scanning speed for achieving desired ablation line width.

Example 1

Figure 3A:
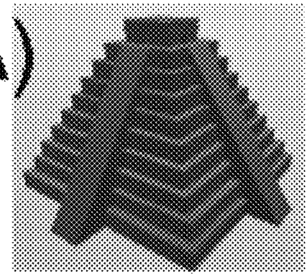
FIG. 3A is a diagram illustrating slicing of a model of Mayan pyramid to create a stack of digital masks for use with the present invention.
Figure 3A:
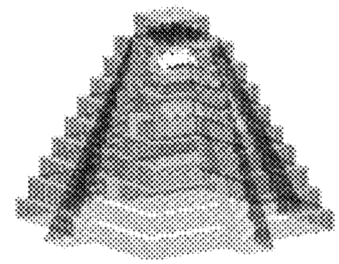
Figure 3A:
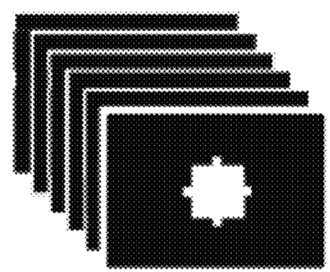
Figure 3B:
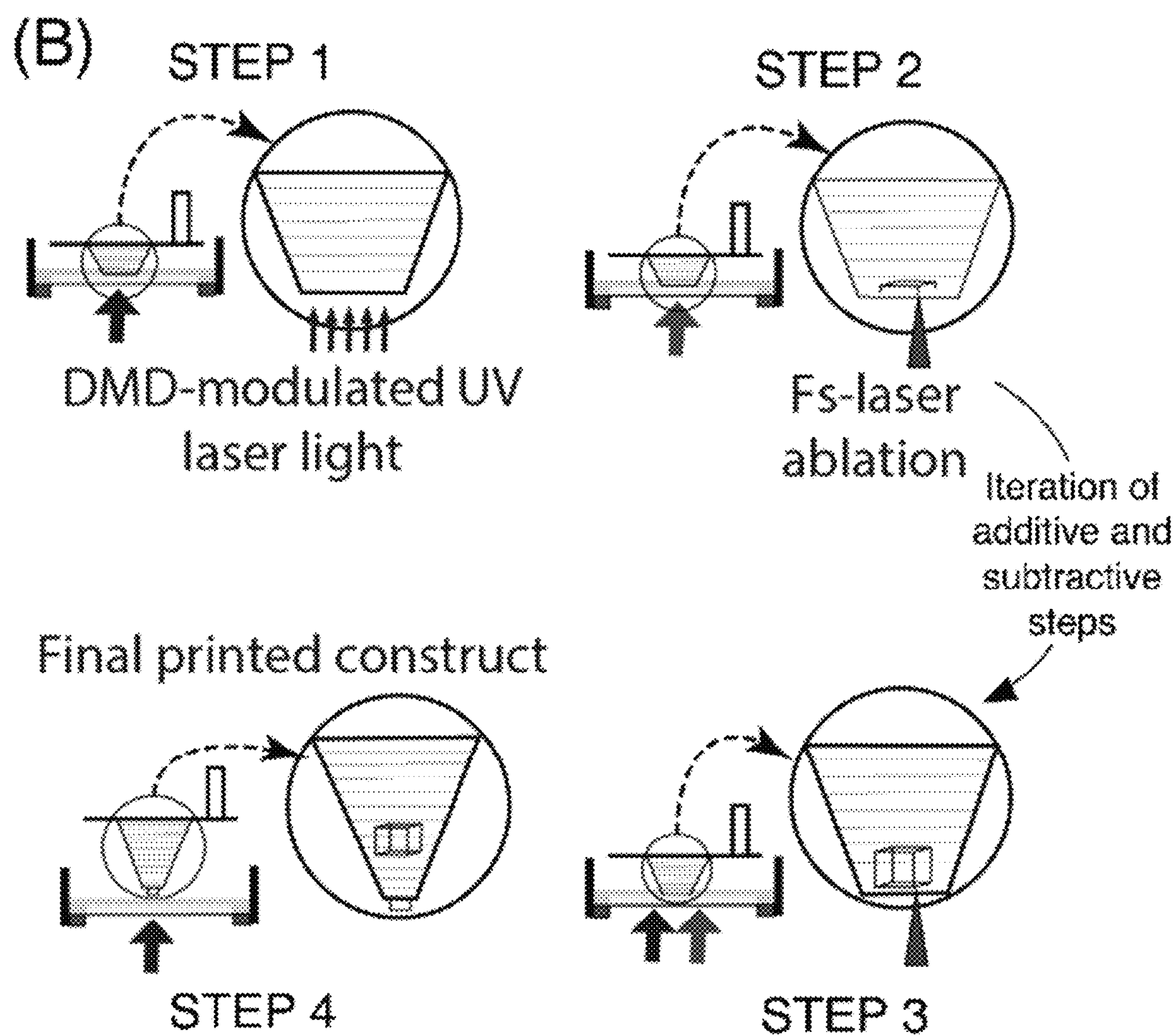
FIG. 3B is a schematic of the key steps in the HLP process of the present invention to print the Mayan pyramid of FIG. 3A with an embedded cube frame.
Figure 3C:
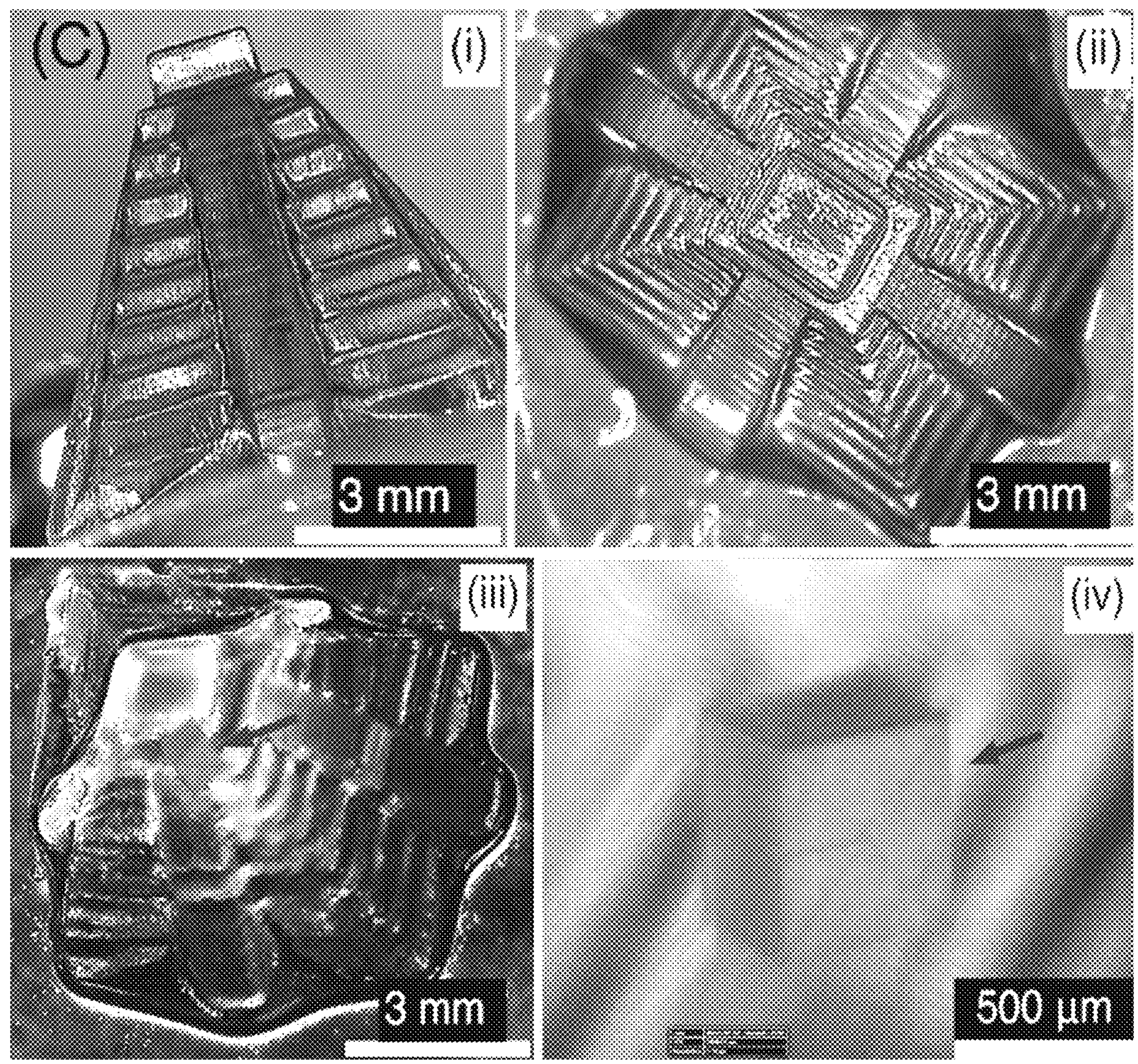
FIG. 3C are a series of side, top and isometric views of a cube within a pyramid structure formed in 90% PEGDA, 1% LAP where the height of the pyramid is 6 mm, the cube is $600\times600\times600$ $\mu m^3$ and embedded 2 mm from the bottom of the pyramid.

To test the achievable design complexity of HLP, a Mayan pyramid, with a hollow cube-frame embedded within a 3D pyramid structure, was fabricated using 90% PEGDA, 1% LAP prepolymer solution. Briefly, a 3D model of a Mayan pyramid was sliced to generate digital masks for the DMD using a custom written algorithm, as seen in FIG. 3A, and additive-subtractive sequential processes of the present invention were used to print the structure in an automated manner, as seen in FIG. 3B. For the additive steps, a laser wavelength ($\lambda_{add}$) of 400 nm and crosslinking laser power ($P_{add}$) of 200 mW was used to selectively crosslink PEGDA layers in a continuous fashion onto a methacrylated glass coverslip. For subtractive steps, a laser wavelength ($\lambda_{sub}$) of 800 nm, an ablation laser power ($P_{sub}$) of 1200 mW, and a scanning speed ($v_{sub}$) of 100 μm/s was used to ablate a hollow cube-frame within the crosslinked layers. The additive and subtractive process was iterated in an automated fashion to fabricate the Mayan pyramid (6 mm tall) with an embedded cube-frame (600 $\mu m^3$). The location of the cube was 2 mm inside the pyramid from the base of the pyramid, as seen in FIG. 3C. A total fabrication time of 66 mins was required, and was dominated by the time required for subtractive steps (62 mins) as compared to all the additive steps combined (3.6 mins) and the time required to transition between steps (0.4 mins). This example demonstrates the ability of the preset invention to remove material at any depth within a 3D structure. As compared to conventional laser based fabrication methods, where laser penetration depth is substantially influenced by the optical properties of the prepolymer solution, the present invention is less dependent on the optical properties of the prepolymer solution due to the sequential additive and subtractive modes of fabrication.

Example 2

Figure 4A:
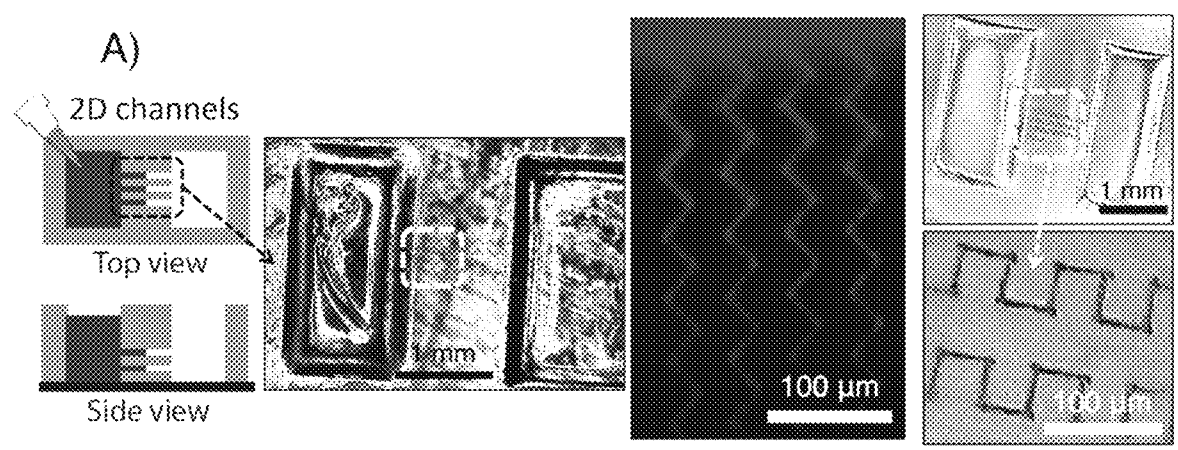
FIG. 4A is a schematic and series of images showing the printing of user-defined two-well PEGDA chips with interconnecting in-plane microchannels with a perfusion of Rhodamine B through zig-zag and square wave channels.
Figure 4B:
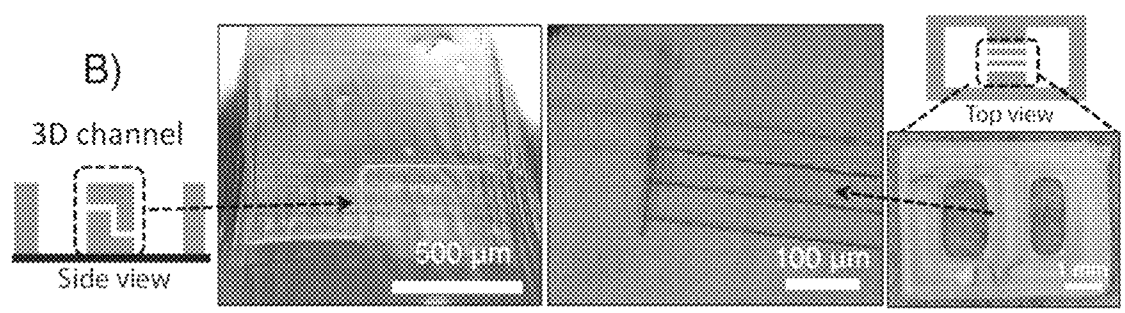
FIG. 4B is a schematic and series of images showing the printing of user-defined two-well PEGDA chips with interconnecting out-of-plane channels.

To further demonstrate the printing capabilities of the present invention, open-well chips were printed using 10% PEGDA 1% LAP, as seen in FIGS. 4A and 4B. Multilayer 1.5 mm thick chips that consist of two open rectangular wells (1.25 mm×2.5 mm) connected by either in-plane microchannels (6 μm in diameter), seen in FIG. 4A, or out-of-plane microchannel (8 μm) were printed, as seen in FIG. 4B. For both of these structures, the total printing time was 4.5 mins. For chips with embedded in-plane microchannels, the DMD-modulated laser beam was used to print rectangular wells using a $\lambda_{add}$ of 400 nm, a $P_{add}$ of 150 mW, and a $t_{add}$ of 20 s followed by ablation of microchannels in straight, zig-zag, and square-wave configurations using a $P_{sub}$ of 1200 mW and a $v_{sub}$ of 100 μm/s. Repeated scans (2 times) are necessary to ensure that channels are not blocked with any debris. Rhodamine B dye, pipetted in one of the wells, was observed to perfuse within the channels under static hydrostatic pressure as shown in FIG. 4A. Chips with out-of-plane 3D microchannels were fabricated using a $P_{add}$ of 150 mW, a $t_{add}$ of 20 second in the additive mode, and a $P_{sub}$ of 1300 mW with a $v_{sub}$ of 50 μm/s in the subtractive mode. Sequential additive and subtractive modes in HLP allow the ablation of 3D channel that span across multiple crosslinked layers, as seen in FIG. 4B.

Example 3

Figure 5A:
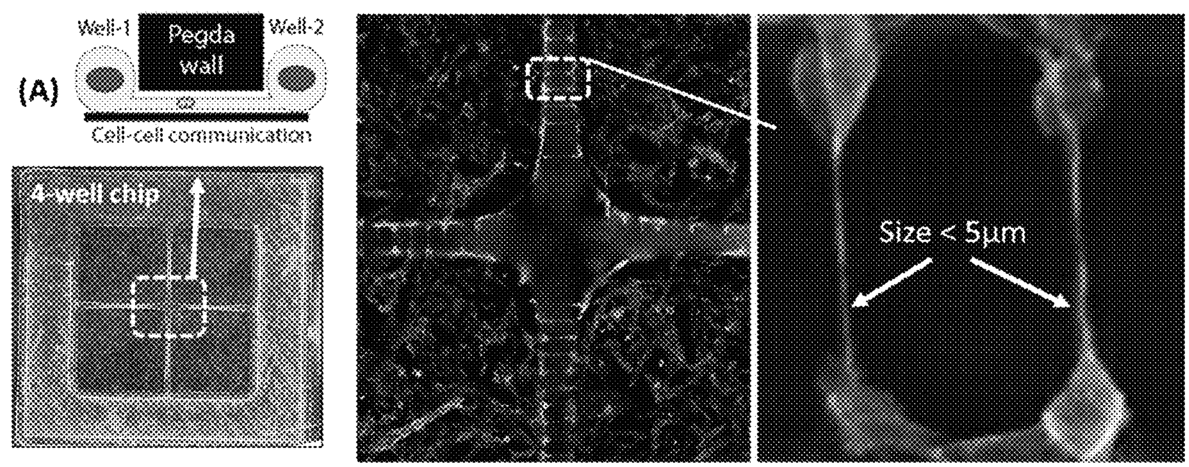
FIG. 5A is a series of images of a 4-well PEGDA chip with inter-well microchannels (5 μm) formed according to the present invention showing that MLO-Y4 cells seeded in neighboring wells communicate with each other by extending cell processes within the ablated channels.
Figure 5B:
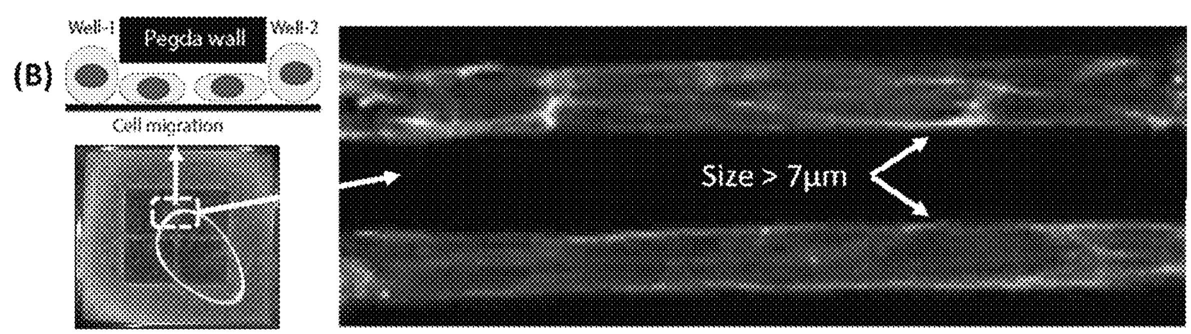
FIG. 5B is a series of images of a 4-well PEGDA chip with inter-well microchannels (7 μm) formed according to the present invention showing that seeded osteosarcoma Saos-2 cells migrate within the ablated channels.

To demonstrate the utility of HLP for potential bioscience applications, 4-well PEGDA chips with embedded microchannels were printed. To assess the utility of such chips in studying cell-cell communication, a model osteocyte cell line was chosen. In the bone tissue, osteocytes reside within isolated cavities (lacunae) and they communicate with their neighboring cells by forming dendritic processes within hollow microchannels called canaliculi. To mimic this microenvironment, PEGDA chips, 200 μm thick, with 40 microchannels (diameter 5 μm) were ablated within walls (width=100 μm) that separate adjacent wells. These chips were printed using a $P_{add}$ of 150 mW, $t_{add}$ of 20s, $P_{sub}$ of 1200 mW, and $v_{sub}$ of 200 μm/s. For these chips, a total printing time of 3 mins. Mice MLO-Y4 osteocytes, seeded within the chips, remain isolated in their respective wells, however they extend cell processes through the microchannels to establish direct physical contact with cells seeded in the adjacent well. This is confirmed by the presence of the nucleus on either side of the wall, while only cell processes labelled by f-actin are present within the channel, as seen in FIG. 5A.

To potentially extend the utility of these chips to cell migration studies, the chip design was modified by increasing the wall thickness to 300 μm. A $P_{sub}$ of 1400 mW and $v_{sub}$ of 50 μm/s was used to ablate channels of diameter 7 μm, a size that would facilitate cell migration within the channel. Model human Saos-2 osteosarcoma cell line, chosen for this work, is able to migrate within the channels, as indicated by the presence of both f-actin and nucleus within the interconnecting channels on day 4. For these chips, a total printing time of 11 mins was required to account for the increased wall thickness and channel sizes.

Figure 5C:
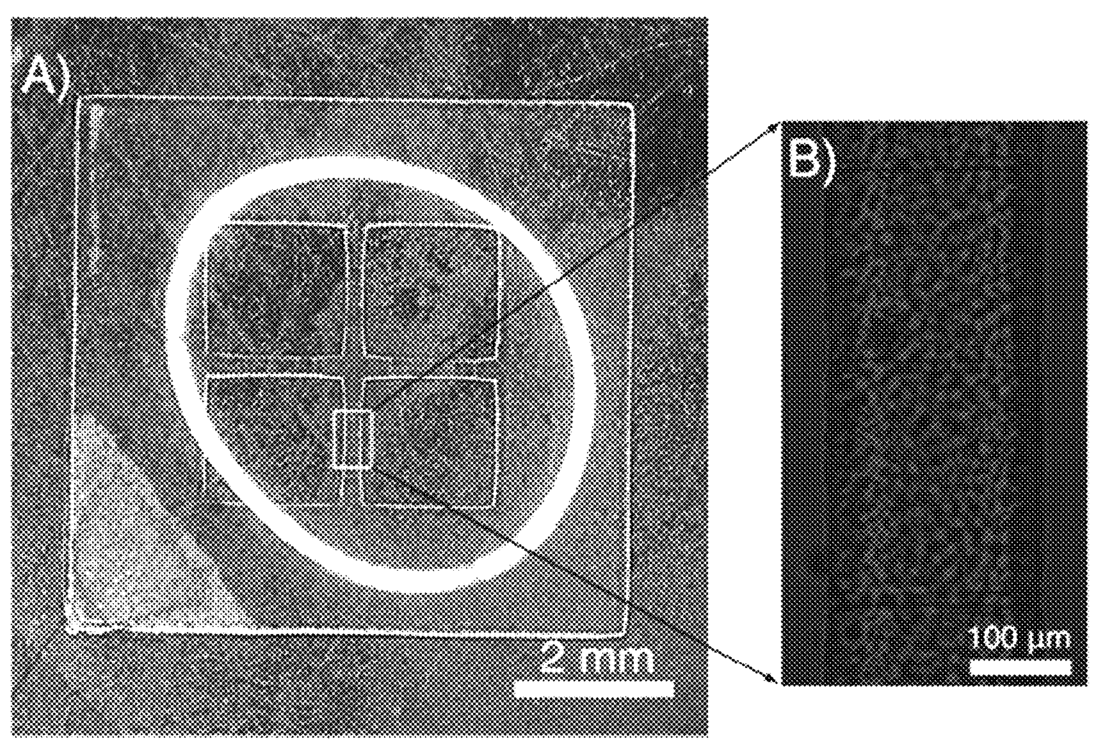
FIG. 5C is an image of four well chips printed using a naturally-derived gelatin methacrylate (GelMA) hydrogel.

To demonstrate that HLP according to the present invention can be extended to other photosensitive hydrogels, 4-well chips using naturally-derived gelatin methacrylate (GelMA) hydrogel were printed using a $P_{add}$ of 200 mW, $t_{add}$ of 25s, $P_{sub}$ of 1000 mW, and $v_{sub}$ of 100 μm/s, as seen in FIG. 5C.

Example 4

Figure 6A:
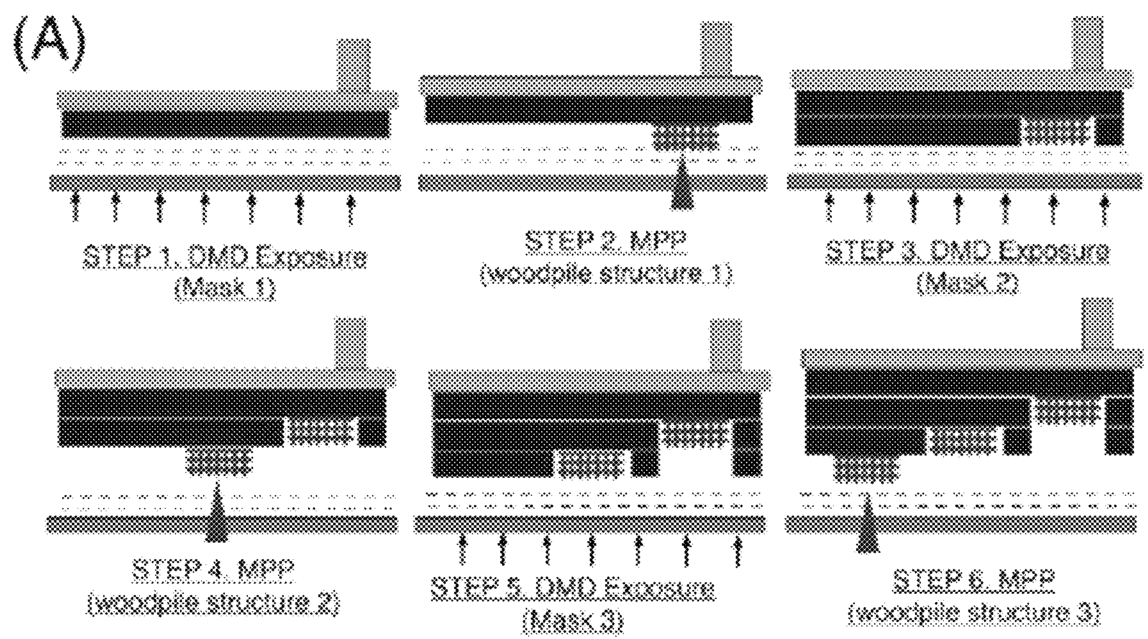
FIG. 6A is a schematic of sequential additive steps of DMD based printing (CLIP) and multiphoton polymerization (MPP)
Figure 6B:
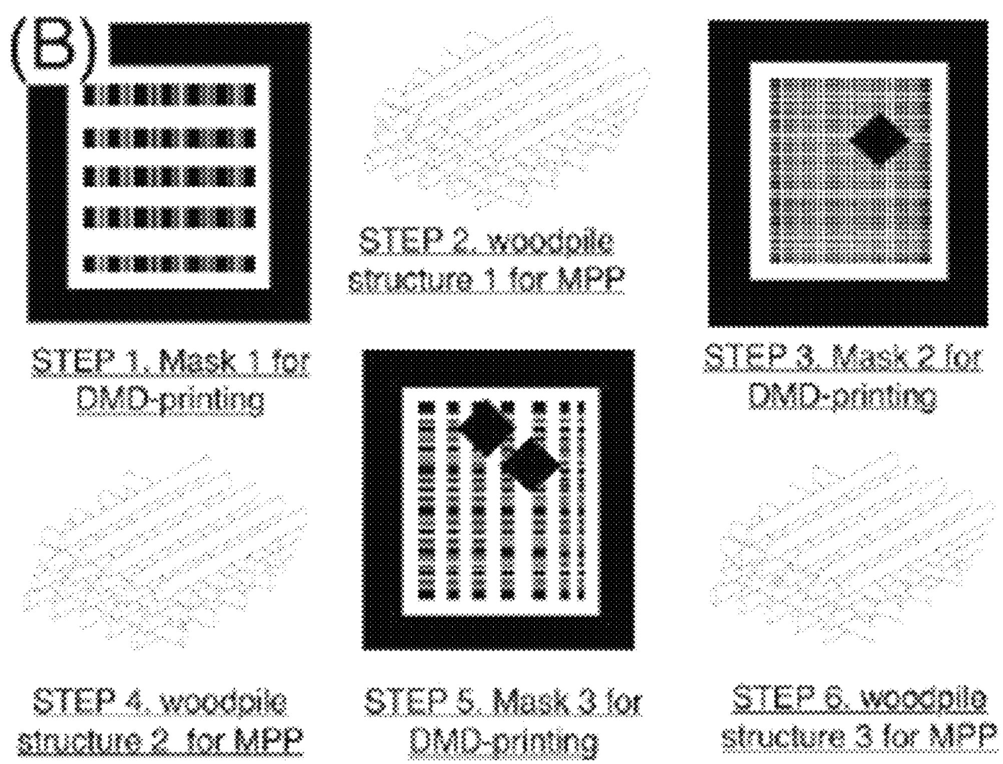
FIG. 6B is a schematic showing corresponding DMD masks and wood pile structures.
Figure 6C:
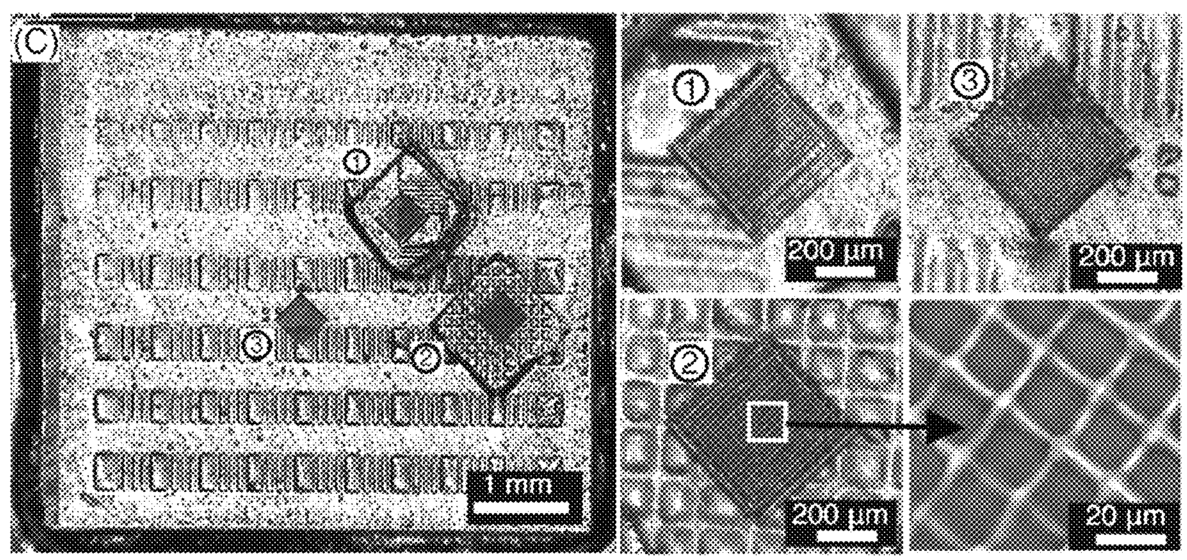
FIG. 6C is series of images depicting three logpile structures fabricated at different z-planes and xy spatial locations according to the present invention.

HLP according to the present invention may be used in additive DMD based printing (CLIP) and additive multiphoton polymerization (MPP) to achieve on-demand fabrication of multiscale 3D structures with superior design flexibility. To demonstrate this capability, a prepolymer solution (90% PEGDA, 1% LAP) was used to print a multi-tier design that consists of three log-pile structures printed on different Z-heights and XY locations. FIG. 6A illustrates the sequence of steps that were used, while FIG. 6B shows the series of masks for additive CLIP and laser paths during the additive MPP steps. In the first step, a 200 μm thick layer was additively printed using CLIP (Mask 1). In the second step, MPP was used to print the first woodpile structure. This is followed by Step 3, where another 200 μm thick layer was printed using Mask 2 (CLIP). Similarly, sequential use of MPP and CLIP was used to print the rest of the structure (Steps 3-6). To clearly visualize the embedded 3D logpile structures in different z-planes without mechanical sectioning, a rhombus shaped blank structure was added to the DMD masks. FIG. 6C depicts a representative HIROX digital microscopy image of HLP-printed 3D multiscale structure. In this study, additive CLIP steps used a laser power of 200 mW and exposure time of 5 sec, while additive MPP steps used a laser power of 400 mW and scanning speed of 100 μm/s using an objective lens (Zeiss, 20×) with numerical aperture of 0.25. The logpile structures consists of 10 layers of logpile structure (log-size=2 μm; log-spacing=20 μm). Each logpile structure is ~80 μm thick and each structure is printed at different z-levels/heights, as seen in FIG. 6D. The total fabrication time of 45 minutes is mostly dictated by the MPP steps. This example demonstrates that the HLP is capable of fabricating 3D multiscale structure using multistep and automated additive-additive approach.

Example 5

Figure 7A:
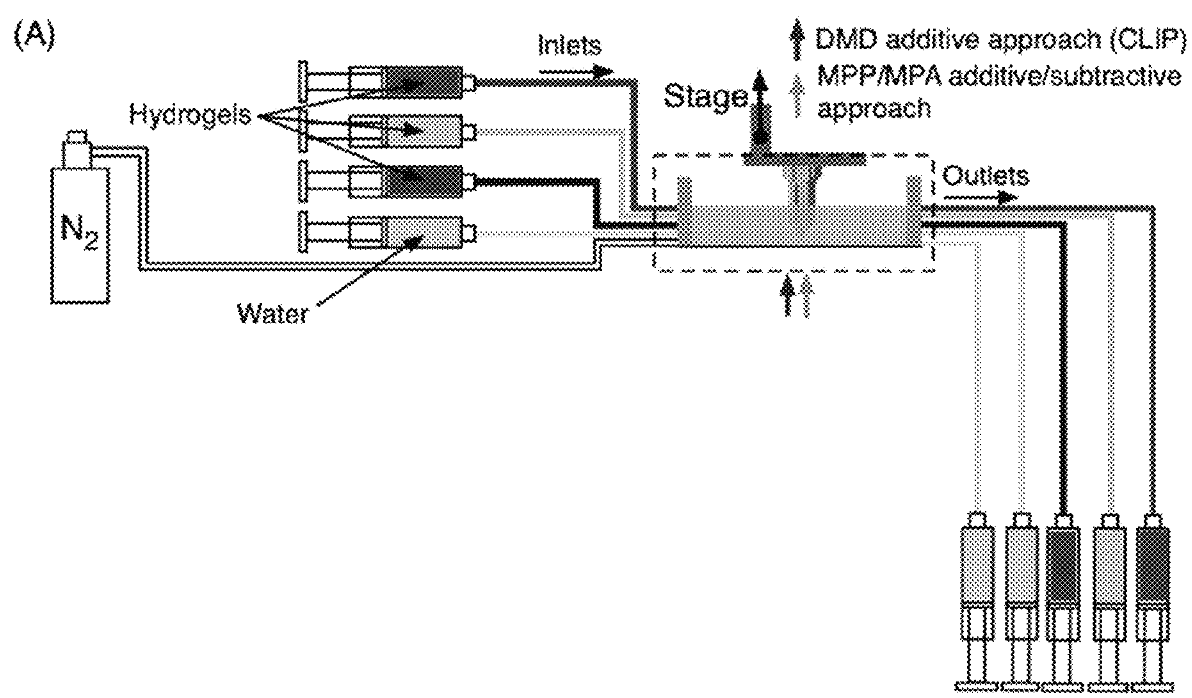
FIG. 7A is a schematic of a Syringe pump system for multiscale multimaterial fabrication using a femtosecond laser-based additive-subtractive HLP system according to the present invention.
Figure 7B:
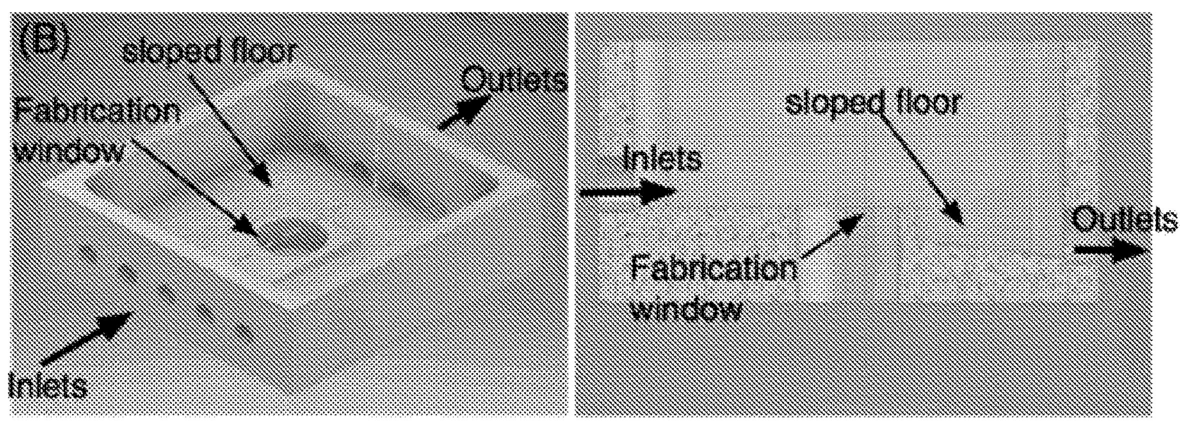
FIG. 7B is a series of views of the fluid chamber of FIG. 7A showing a sloped floor design that facilitates easy exchange of prepolymer solutions during printing.

To demonstrate HLP's capability to printing multi-material 3D structures, a new fluid chamber with necessary tube connections was built to enable efficient switching of different prepolymer solutions, as seen in FIGS. 7A and 7B. The fluid chamber was designed using Autodesk Inventor and machined using a vertical mill. The sample holder consists of the five 3 mm diameter inlets, printing region (also known as fabrication window) of 1 cm in diameter, and five 3 mm diameter outlets. Three inlets were used to pump different hydrogel prepolymer solutions, while the fourth and the fifth inlets were designed to pump in washing solution and/or nitrogen. Similarly, three of outlets were designed to pump-out the prepolymer solution to the respective syringes so that the solutions can be reused. The other two outlets were used to drain the DI water during washing steps; this step is necessary to avoid mixing of different prepolymer solutions during printing. A circular hole (diameter 10 mm) was drilled in the center of the sample holder and a thin Teflon film was glued. This area is named as fabrication window where the exposure of the hydrogel prepolymer solution takes place. The floor of the fluid chamber was sloped so that the prepolymer solutions can be easily drained during the washing steps. Before introducing new prepolymer solution, compressed nitrogen was used to remove previous solutions and/or water. While printing GelMA structures, the heater was maintained at 40° C. This setup allowed for repeatable printing of multi-materials structures with no mixing of the prepolymer solutions.

Example 6

HLP in DMD based additive mode (CLIP) was used to demonstrate the multi-material printing capability in both the Z (Mayan Pyramid as seen FIG. 8A) and the XY (yin and yang as seen in FIG. 8B) directions. First, digital masks and image of a Mayan Pyramid printed using three solutions composed of 90% PEGDA hydrogel, 1% LAP photoinitiator and food color dye of different colors (blue, green, and red). This structure was printed using the crosslinking laser power of 200 mW, a printing speed in the vertical direction of 0.02 mm/s, and an exposure time per layer of 3 seconds. Similarly, yin-yang structure was printed using a laser power of 200 mW and exposure time of 5 secs for each step. Second, additive DMD based mode (CLIP) was combined with additive MPP to print nested logpile multiscale 3D structures using three different polymer compositions, as seen in FIG. 8C. First, CLIP was used to print the outer thick pink wall using 20% GELMA, 0.25% LAP doped with Rhodamine B dye. Second, CLIP was used to print internal walls (that separate the wells) using 50% PEGDA, 1% LAP. For both these structures, a crosslinking laser power of 200 mW and exposure time of 5s was used. Third, MPP was used to print high resolution logpile structure using a laser power of 400 mW and scanning speed of 100 μm/s. The laser beam was focused using 20× objective lens (Zeiss, NA=0.25) to obtain a minimum feature size of 2 μm. Next, multi-material 3D structures were generated by combining additive CLIP and subtractive MPA modes. Additive CLIP was used to print structures using two hydrogel compositions (90% PEGDA, 0.5% LAP with green food dye, 50% PEGDA, 0.5% LAP, with red food dye) with a laser power of 200 mW and exposure time of 5s as seen in FIG. 8D. Laser processing conditions to achieve a specific ablation size within both materials were used to ablate an array of channels in both regions using MPP. For this step, laser power was kept constant (1500 mW) and the scanning speed was switched between 50 μm/s to 150 μm/s. The plot in FIG. 8E can be explicitly used to ablate desired linewidth structures in this material. For instance, to print a uniform channel of (~7.6 μm) throughout the both slabs, the scanning speed is maintained at 130 μm/s inside the 90% PEGDA slab and 50 μm/s inside the 50% PEGDA slab.

Contrary to materials found in nature that possess 3D structural hierarchy and material heterogeneity, man-made materials remain relatively simple. Current manufacturing technologies are limited by a trade-off between the use of multiple materials, overall size range, dimensionality, throughput and resolution. For instance, subtractive methods based on lithography (photo-, soft-, nanoimprint-lithography) exhibit excellent feature resolution, however these methods typically generate planar devices or they required complicated multiple bonding and stacking steps to fabricate devices with even simple 3D designs. On the other hand, additive manufacturing methods such as FDM, MJM, and DLP offer 3D design flexibility, however achieving microscale resolution with these methods remain challenging. Among the various fabrication methods at our disposal, ultrafast lasers, with their unique property of nonlinear multiphoton absorption, have revolutionized the processing of materials at micrometer scale using MPP and MPA. By comparison, the present invention is a single versatile manufacturing platform referred to as HLP. HLP, by combining additive CLIP with additive MPP and subtractive MPA processes, enables quick printing of centimeter-sized hydrogel chips with embedded hollow or solid micro-features; this would otherwise require, multiple planar fabrication followed by the complex alignment of multiple components using conventional lithography. Integration of subtractive MPA with CLIP also ensures reliable removal of material in defined locations. This is a clear advantage as compared to current 3D printing methods where removal of support or sacrificial material from micro-channels/features remains challenging. HLP has the ability to shape soft hydrated and difficult-to-process hydrogel materials into complex multiscale structures that are either highly challenging, or time consuming to fabricate, or cannot be fabricated using current methods.

One conventional approach that has been widely used, combines ultrafast lasers in additive (MPP) and subtractive (MPA) modes to fabricate complex 3D structures using epoxy based photoresists. However, the time-consuming serial nature of the both MPP and MPA has limited the scalability of these methods and therefore their utility in the field for making centimeter sized devices. In comparison, HLP according to the present invention combines additive CLIP with MPP/MPA processes to enable printing of centimeter-sized hydrogel chips with embedded micro-features within minutes.

Another laser hybrid method utilizes specialized materials such as Foturan photosensitive glass to make hollow micro-features. This method involves two steps. In step 1, laser irradiation is used to modify the material properties to allow facile removal of materials using chemical etching. In step 2, MPP is used to crosslink complex 3D structure within the chemically etched channels. Since processing requirements for the etching and MPP steps are distinct, this approach cannot be automated into a multi-step multi-layer process. Additionally, the use of harsh chemical and processes (etching and high temperature treatment) makes this process incompatible with hydrogel materials. In comparison, HLP according to the present invention can print 3D structures with embedded features at a resolution of few micrometers using a multi-step multi-layer automated process without the use of any harsh processing steps, which is a key materials criterion when working with soft hydrogel materials. Although HLP has been demonstrated using model synthetic PEGDA and naturally-derived GelMA hydrogels, those of skill in the art should recognize that HLP can be extended to other photosensitive materials.

Laser based methods such as MPA depend heavily on the optical properties (transparency, absorption, scattering) of the material. Low laser penetration depths limits the processing range of subtractive ablation within the materials. In contrast, HLP according to the present invention allows the fabrication of hollow micro-features at any depth within a complex user-defined 3D microstructures. This unique feature was demonstrated above by the printing of (i) an embedded hollow cube-frame deep within a Mayan Pyramid 3D structure as seen in FIG. 3C (ii) an embedded out-of-plane microchannel within a two-well PEGDA chip as seen in FIG. 4B, and (iii) 3D logpile structures at different depth/heights as seen in FIG. 6. The sequential additive-subtractive modes make this technique more-or-less independent of stringent processing depth limits. HLP can be potentially used to fabricate 3D structures using less transparent materials as well, thus decreasing the dependence of laser penetration depths on the optical properties of the materials.

Laser based methods that combine two separate additive processing steps or methods have been used to fabricate multiscale 3D structures. For instance, SLA was used to print multiscale surface features with a resolution of 37 μm by adaptively switching the laser spot and slice layer thicknesses. Shaped laser beams with adaptive layer thicknesses were used to print 3D multiscale structures with a resolution of 30 μm, although hollow microscale features were not reported. Large area multiscale printing was demonstrated by synchronizing linear scanner with high speed capability of galvano scanners. As compared to the methods described above, HLP according to the present invention can print 3D multiscale structures with a smallest feature size of 3 μm. FIG. 6 highlights the quick fabrication of 3D multiscale structures with superior design flexibility.

Few light-based methods have been adopted for multi-material printing as explained below. SLA and DMD based optical lithography have been used to print multiple low viscosity resins, and hydrogel-based materials. To improve the fabrication speed, DMD-SLA was recently combined with a microfluidic device and an air-jet to achieve automated and quick material exchanges. Recently, a commercial direct laser writing system was combined with a microfluidic chamber to enable 3D multimaterial printing. As compared to the current methods, HLP according to the present invention enables multi-material printing in additive-additive (CLIP-CLIP), additive-additive (CLIP-MPP), and additive-subtractive (CLIP-MPA) modes as seen in FIG. 8. By combining CLIP with MPP and MPA, HLP achieves a suitable trade-off between the use of multi-materials, overall throughput, size-range and feature resolution, factors critically important in manufacturing 3D multiscale structures.

The HLP technology can be further improved to enable new capabilities. For instance, the maximum size of printable 3D structure can be increased by simply modifying the polymer chamber, and by adding new inlet channels can be used to increase the number of materials. Additionally, the speed of multi-material HLP can be further improved by adopting a continuous stop-flow lithography method and automation of fluid exchange and printing processes.[28] Furthermore, future studies can be made to better the understand the ablation mechanism, which is not currently known. Based on known literature, the formation of shockwaves and cavitation, likely led to a disruptive breakdown of the hydrogel matrix and resulted in the generation of voids during the subtractive ablation mode of HLP, however systematic studies are required. In the future, it is also advisable to study the chemical composition of the ablated regions, which is at this point difficult due to their microscale size of the ablation voids and mechanically weak nature of hydrogel materials.

In essence, HLP according to the present invention has the potential to revolutionize the ability to make 3D multiscale multi-material structures, specifically those structures that consist of internal or embedded hollow features that cannot be made using current technologies.

In summary, the present invention seamlessly combines additive crosslinking and subtractive ablation modes of femtosecond laser to achieve the printing of 3D multiscale multi-material structures using difficult-to-process hydrogel materials. Quick fabrication of multiscale structures with embedded hollow microfeatures demonstrates superior design flexibility of HLP as compared to conventional lithography methods, with a resolution close to that achieved by lithography. The ability to print multi-materials in additive-additive and additive-subtractive modes demonstrates the fabrication versatility of HLP. This capability can be potentially used to print 3D multi-material hydrogel-based structures for a variety of applications in biomedical sciences, microfluidics, soft robotics, optics, photonics and other application areas.

What is claimed is:

1. A system for forming a structure from a polymer, comprising:

a stage having a sample holder for holding a prepolymer solution and a window formed through the sample holder;

a femtosecond laser source capable of emitting a plurality of laser pulses having a first predetermined wavelength;

a second harmonic generator aligned with the femtosecond laser source to generate a second predetermined wavelength for a first portion of the plurality of the laser pulses;

a digital micro-mirror device aligned with the second harmonic generator and the window of the stage to spatially modulate ultraviolet wavelength pulses according to a first predetermined pattern so that the prepolymer solution is cross-linked into a layer of a polymer according to the first predetermined pattern; and an objective lens aligned with the femtosecond laser source and the window of the stage to allow a second portion of the laser pulses having the first predetermined wavelength to ablate a plurality of voids in any layer of the polymer that forms in the sample holder.

2. The system of claim 1, wherein the stage is configured to translate away from the window.

3. The system of claim 2, wherein the first predetermined wavelength is 800 nm.

4. The system of claim 3, wherein the second predetermined wavelength is 400 nm.

5. The system of claim 4, wherein the layer of the polymer that forms in the sample holder will be spaced apart from the window by a zone having a predetermined thickness that includes the prepolymer solution.

6. The system of claim 5, wherein the plurality of voids will be formed in an ablation range adjacent to the zone.

7. The system of claim 6, wherein the laser source is configured so that each of the plurality of laser pulses are 150 femtoseconds wide.

8. The system of claim 7, wherein the laser source is configured so that the plurality of laser pulses have a repetition rate of 80 MHz.

* * * * *